(12) United States Patent
Tsotridis

(10) Patent No.: US 9,142,841 B2
(45) Date of Patent: Sep. 22, 2015

(54) MICRO-TUBULAR SOLID OXIDE FUEL CELL ARRANGEMENT

(75) Inventor: Georgios Tsotridis, KH Alkmaar (NL)

(73) Assignee: THE EUROPEAN UNION, REPRESENTED BY THE EUROPEAN COMMISSION (BE)

( * ) Notice: Subject to any disclaimer, the term of this patent is extended or adjusted under 35 U.S.C. 154(b) by 120 days.

(21) Appl. No.: 14/119,249

(22) PCT Filed: May 23, 2012

(86) PCT No.: PCT/EP2012/059618
§ 371 (c)(1),
(2), (4) Date: Nov. 21, 2013

(87) PCT Pub. No.: WO2012/160102
PCT Pub. Date: Nov. 29, 2012

(65) Prior Publication Data
US 2014/0186739 A1  Jul. 3, 2014

(30) Foreign Application Priority Data
May 23, 2011 (EP) .................... 11167086

(51) Int. Cl.
H01M 6/44 (2006.01)
H01M 8/02 (2006.01)
H01M 8/24 (2006.01)

(52) U.S. Cl.
CPC .......... *H01M 8/0247* (2013.01); *H01M 8/0252* (2013.01); *H01M 8/243* (2013.01); *H01M 8/2465* (2013.01); *Y02E 60/50* (2013.01)

(58) Field of Classification Search
None
See application file for complete search history.

(56) References Cited

U.S. PATENT DOCUMENTS 3,216,911 A * 11/1965 Kronenberg .................. 205/784
2004/0023101 A1 2/2004 Jacobson et al.
(Continued)

FOREIGN PATENT DOCUMENTS

| EP | 0562724 A2 | 9/1993 |
| EP | 1328034 A2 | 7/2003 |
| JP | 4407235 A | 5/2005 |

OTHER PUBLICATIONS

International Preliminary Report on Patentability or corresponding application PCT/EP2012/059618 filed May 23, 2012; Mail date Jun. 17, 2013.
(Continued)

*Primary Examiner* — Patrick Ryan
*Assistant Examiner* — Lucas J O Donnell
(74) *Attorney, Agent, or Firm* — Cantor Colburn LLP

(57) ABSTRACT

A micro-tubular solid oxide fuel cell arrangement includes two micro-tubular elements having a tubular inner electrode, covered on its outer surface with an electrolyte, the electrolyte being covered on its outer surface with a tubular outer electrode; and a connection element arranged between the micro-tubular elements for connecting one end of one micro-tubular element to one end of the other micro-tubular element, where the micro-tubular element has a first end portion with an inner cone arranged in the tubular inner electrode and a second end portion with an outer cone arranged in the tubular outer electrode, where the connection element comprises a metallic interconnector plate having a first side and an opposite second side, where the plate is provided with at least one hole; a first metallic connector on the first side and arranged around the hole and a second metallic connector on the second side and arranged around the hole.

9 Claims, 3 Drawing Sheets

(56) References Cited

U.S. PATENT DOCUMENTS

2009/0130528 A1* 5/2009 Gallet et al. .................... 429/34
2013/0288150 A1* 10/2013 Hodges et al. ................ 429/466

OTHER PUBLICATIONS

International Search Report for corresponding application PCT/EP2012/059618 filed May 23, 2012; Mail date Aug. 1, 2012.

* cited by examiner

MICRO-TUBULAR SOLID OXIDE FUEL CELL ARRANGEMENT

TECHNICAL FIELD

The present invention relates to a micro-tubular solid oxide fuel cell (SOFC) arrangement, in particular for the construction of a solid oxide fuel cell stack.

BACKGROUND

A solid oxide fuel cell is an electrochemical conversion device that produces electricity directly from oxidizing a fuel. The SOFC has a ceramic electrolyte. Advantages of this class of fuel cells include high efficiency, long-term stability, fuel flexibility, low emissions, and relatively low cost. The largest disadvantage is the high operating temperature, which results in longer start-up times and mechanical and chemical compatibility issues.

In order to e.g. shorten the start-up times, it has been proposed to use micro-tubular cells instead of planar type cells and to place them in series, thus obtaining micro-tubular SOFCs, which consist of a tubular electrolyte sandwiched between two electrodes, an anode and a cathode. Such micro-tubular SOFCs are e.g. shown in JP 44 07235, wherein short tubular elements are connected in series by means of an interconnector. Such interconnectors are ring-shaped elements receiving, on each side, one end of a short tubular element. An assembly of a plurality of short tubular elements with interconnectors therebetween forms a long tubular fuel cell element.

Such long tubular fuel cell elements also need to be connected in parallel. In order to achieve this, JP 44 07235 suggests connecting two ring-shaped elements together by means of a land.

The interconnector disclosed in JP 44 07235 thus allows the fuel cell elements to be connected in series and in parallel. However, the construction of the fuel cell using such interconnectors is rather cumbersome and time consuming. Furthermore, any play between a short tubular element and an interconnector can be problematic due to the large number of short tubular elements connected in series. Even small plays in a number of connections can quickly accumulate to an inacceptable play over the length of the tubular fuel cell element, thereby endangering the stability of the fuel cell.

BRIEF SUMMARY

The invention provides an improved micro-tubular solid oxide fuel cell arrangement not displaying the above shortcomings.

The present invention proposes a micro-tubular solid oxide fuel cell arrangement comprising at least two micro-tubular elements, the micro-tubular elements comprising a tubular inner electrode, covered on its outer surface with an electrolyte, the electrolyte being covered on its outer surface with a tubular outer electrode; and a connection element arranged between the micro-tubular elements for connecting one end of one micro-tubular element to one end of the other micro-tubular element. According to an important aspect of the invention, the micro-tubular element comprises a first end portion with an inner cone arranged in the tubular inner electrode and a second end portion with an outer cone arranged in the tubular outer electrode to form an electric serial connection of the micro-tubular elements. The connection element comprises a metallic interconnector plate having a first side and an opposite second side. The interconnector plate is provided with at least one hole; a first metallic connector on the first side and arranged around the hole and a second metallic connector on the second side and arranged around the hole. The first metallic connector has a conical shape with a cross-section narrowing in a direction away from the interconnector plate, the first metallic connector being dimensioned and arranged for contacting the first end portion of one of the micro-tubular elements. The second metallic connector has a conical shape with a cross-section growing in a direction away from the interconnector plate, the second metallic connector being dimensioned and arranged for contacting the second end portion of another one of the micro-tubular elements.

The micro-tubular elements can be stacked quickly and easily by using the metallic interconnector plate. The small size of the micro-tubular elements, the tubular design itself and the short distances of the connections reduce the possible problem of different thermal expansions of the tube material and the metallic interconnector plate material. The cones allow a sealing and an orientation of the tubes in the assembly. The metallic cone of the metallic connectors also allow for a different thermal expansion of the tube and the metallic connectors without damage. The choice of interconnector material can be optimised for lifetime purposes. A high flexibility of the geometry of the interconnector plate allows a broad application due to high flexible stack geometry. Furthermore, the interconnector plate increases the stability of the fuel cell. Even if there is a small play between one micro-tubular elements and the interconnector plate, this small play is not multiplied over the length of the fuel cell, as the interconnector plate covers the whole width of the fuel cell. The cones also allow reducing such play.

The arrangement preferably comprises a plurality of micro-tubular elements, wherein successive micro-tubular elements are connected to each other by means of a metallic interconnector plate, the plurality of micro-tubular elements forming a tubular fuel cell element. A plurality of micro-tubular elements are connected in series to provide a long tubular fuel cell element.

Advantageously, a plurality of tubular fuel cell elements are arranged parallel to each other forming a fuel cell stack, the metallic interconnector plate comprising a plurality of holes, each associated with a first metallic connector on the first side and a second metallic connector on the second side. A fuel cell stack may thus be easily constructed using a plurality of metallic interconnector plates having a plurality of holes. The metallic interconnector plates not only connect cascading micro-tubular elements in series, but also to connect tubular fuel cell elements in parallel. This arrangement allows for an easy and robust construction of the fuel cell stack. Furthermore, it ensures a good connectivity between the various elements and thus improved efficiency of the fuel cell stack.

The first metallic connector and/or said second metallic connector are preferably made from ductile material. The material should not be brittle because is should allow distortion during heating or cooling without destroying the ceramic material.

The first metallic connector and/or the second metallic connector may be made from or coated with a material chosen from the group comprising silver, silver plated metals or silver containing metals.

Advantageously, the interconnector plate is provided with at least one auxiliary hole for passing at least one heat exchanger tube therethrough. Such heat exchanger tubes are of particular interest if the stack is operated in isothermal mode. In such isothermal mode, the inlet and outlet temperature of the stack is the same and there is no temperature difference between in- and out-coming flows. A cooling device is thus recommended for heat extraction.

Alternatively, the stack may be operated in adiabatic mode, wherein only reactant air is available to cool the stack and a temperature difference between inlet and outlet has to be accepted as a consequence depending on the designed excess air. The amount of air is determined by the allowable stack temperature difference. No cooling device or cooling medium is thus needed necessary in adiabatic mode.

A mixture of both operation modes, adiabatic and isothermal, may be used.

The extracted heat can be used for the fuel processing (mostly pre-reforming, this is oxidation of $C_nH_m$ by $H_2O$, an endothermic reaction) and the heat exchanger is formed as reforming reactor in a stack component.

From a thermodynamic point of view it is also possible to integrate the stack in a chemical process and to use the heat from the stack coolers for operating any endothermic process in chemical industry.

The metallic interconnector plate may have a hexagonal cross-section to minimize stack volume.

The metallic interconnector plate may have a rectangular cross-section, wherein the length of the rectangular is considerably longer than its width. Such a "stripe" layout may be advantageous for integration in different applications as a power generating heater.

The metallic interconnector plate advantageously comprises electrical connectors for electrically connecting different fuel cell stacks to a fuel cell module.

The metallic interconnector plate advantageously comprises mechanical connectors for mechanically connecting different fuel cell stacks to a fuel cell module.

Further advantageous features of the invention are shown in the dependent claims and in the detailed description below.

BRIEF DESCRIPTION OF THE DRAWINGS

The present invention will be more apparent from the following description of a not limiting embodiment with reference to the attached drawings, wherein.

DETAILED DESCRIPTION

Figure 1:
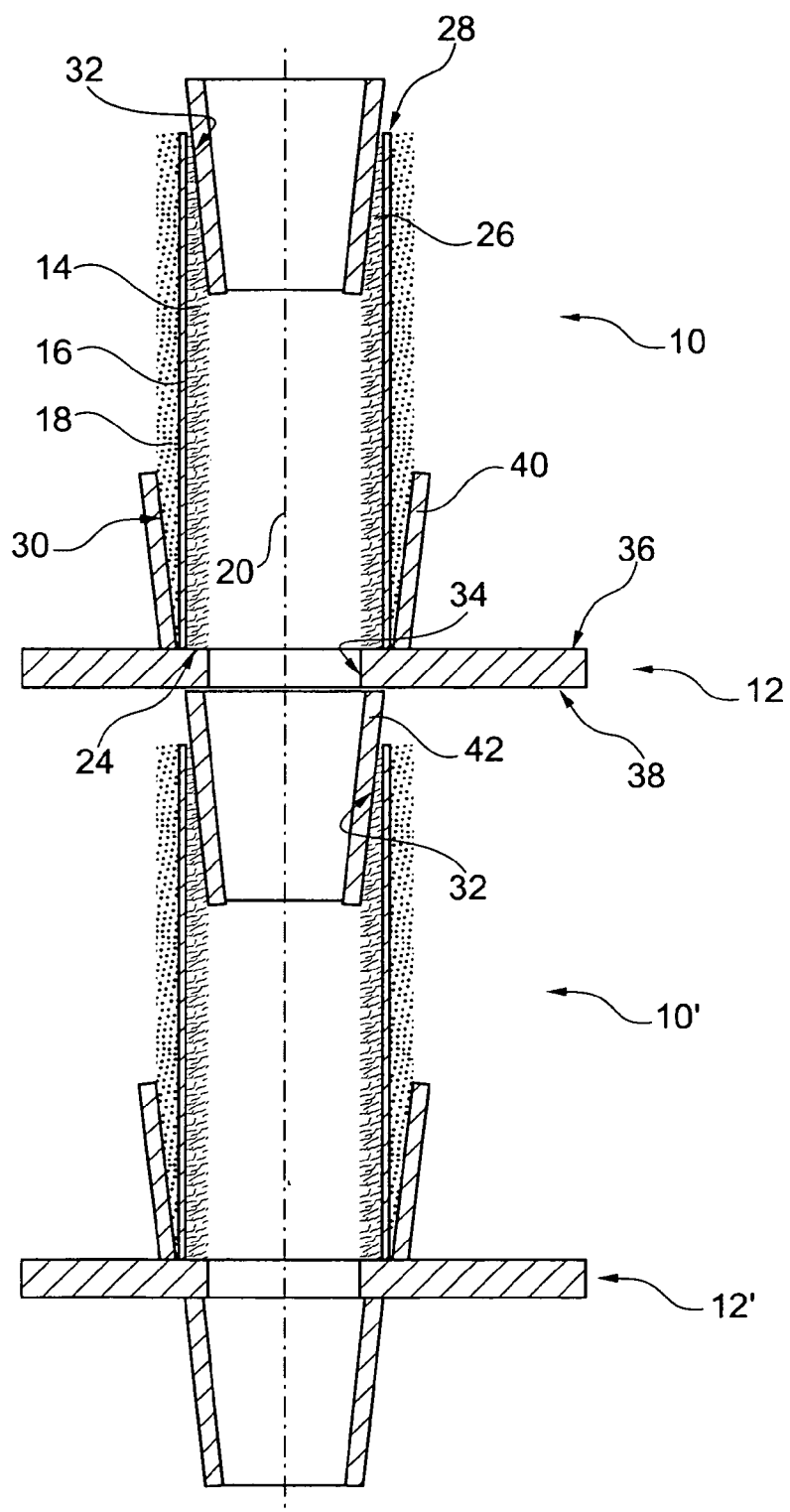
FIG. 1 is a schematic cut through an arrangement according to the invention, comprising a first micro-tubular element, a second micro-tubular element and a metallic interconnector plate therebetween.

FIG. 1 schematically shows two micro-tubular elements connected together by means of a metallic interconnector plate. The figure shows two micro-tubular elements 10, 10' and two metallic interconnector plates 12, 12'. Each micro-tubular element 10, 10' is formed by a tubular inner electrode 14 covered with an electrolyte 16, which is, in turn, covered with a tubular outer electrode 18. The electrolyte 16 is in essence sandwiched between the inner and outer electrodes 14, 18. If the inner electrode 14 is an anode, then the outer electrode 18 is a cathode. Similarly, if the inner electrode 14 is a cathode, then the outer electrode 18 is an anode.

The micro-tubular element 10, 10' has a first end portion 20 leading to a first end 24 and a second end portion 26 leading to a second end 28. At the first end portion 20, the outer electrode 18 is provided with an outer cone 30, i.e. the outer electrode 18 has its thickness reducing in direction of the first end 24 of the micro-tubular element 10, 10'. At the second end portion 26, the inner electrode 14 is provided with an inner cone 32, i.e. the inner electrode 14 has its thickness reducing in direction of the second end 28 of the micro-tubular element 10, 10'.

The metallic interconnector plate 12 comprises a hole 34 for enabling fluid communication between the interior channels of two neighbouring micro-tubular elements 10, 10'. Such an interconnector plate 12 has a first side 36 facing a first micro-tubular element 10 and an opposite second side 38 facing a second micro-tubular element 10'.

On its first side 36, the interconnector plate 12 comprises a first metallic connector 40 arranged around the hole 34. The first metallic connector 40 has an inner cross-section corresponding to the outer cross-section of the first end portion 20 of the first micro-tubular element 10.

On its second side 38, the interconnector plate 12 comprises a second metallic connector 42 arranged around the hole 34. The second metallic connector 42 has an outer cross-section corresponding to the inner cross-section of the second end portion 26 of the second micro-tubular element 10'.

The first and second metallic connectors 40, 42 may be provided with pores for allowing reactant gas flow to and from the electrolyte. Such pores ensure that the reactant flow through the micro-tubular element 10, 10' can take place over the whole length thereof. The presence of the first and second metallic connectors 40, 42 over part of the surface of the micro-tubular element 10, 10' does thus not reduce efficiency of the fuel cell.

The first and second metallic connectors 40, 42 can be made from a ductile material, thus ensuring sufficient flexibility of the micro-tubular elements 10, 10' with respect to the interconnector plate 12.

The cone-shaped connection between micro-tubular elements 10, 10' and the interconnector plate 12 ensures sufficient sealing between the inside and the outside of the micro-tubular elements 10, 10', thus forcing the transfer of fluid between the inside and the outside of the micro-tubular elements 10, 10' to happen through the electrolyte 16.

Furthermore, the metallic cone allows a different thermal expansion between the micro-tubular elements 10, 10' and the interconnector plate 12 without damage. The choice of material for the interconnector plate 12 can be optimised for lifetime purposed.

A high flexibility of the geometry of the interconnector plate 12 allows a broad application due to highly flexible stack geometry.

Figure 2:
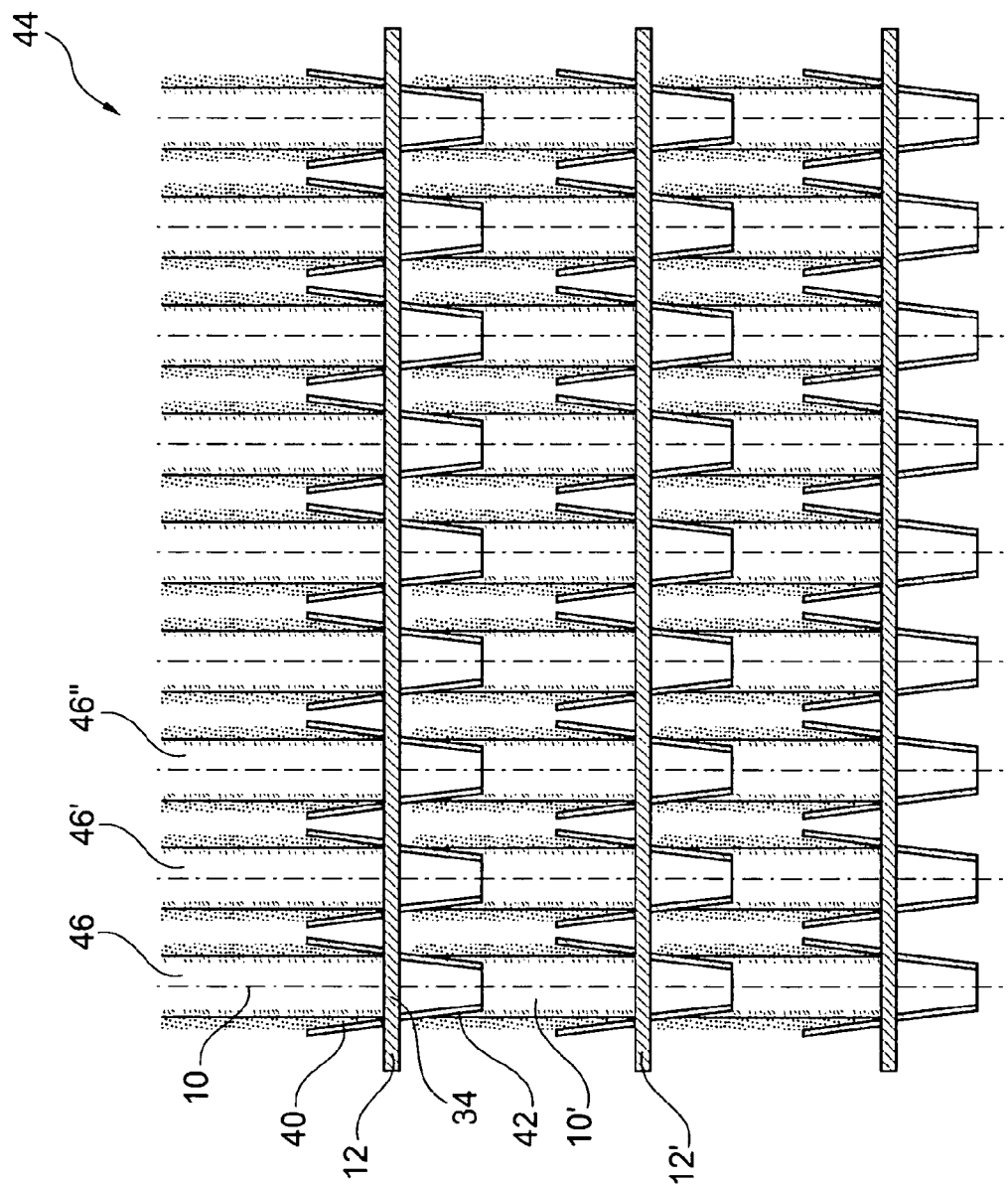
FIG. 2 is a schematic cut through a fuel cell stack according to the invention.

An example of a stack geometry is shown in FIG. 2, which in particular shows a portion of a cut through a fuel cell stack 44. Such a fuel cell stack 44 comprises a number of interconnector plates 12, 12' having a plurality of holes 34, each hole 34 having a first metallic connector 40 and a second metallic connector 42 associated therewith. Micro-tubular elements 10, 10' and interconnector plates 12, 12' are arranged in series so as to form long tubular fuel cell elements 46, 46', 46". FIG. 2 shows a cut through a fuel cell stack 44 and thus shows a row of long tubular fuel cell elements 46, 46', 46" in only a first direction. It will be appreciated that the interconnector plates 12, 12' further have a plurality of holes 34 in a second direction, thus forming long tubular fuel cell elements in also the second direction, thereby constructing a three dimensional arrangement of a fuel cell stack 44.

The interconnector plates 12, 12' of such a fuel cell stack 44 thus not only connect individual micro-tubular elements 10, 10' in series, but also in parallel. There is therefore no need to provide additional connections for connecting one long tubular fuel cell element 46, 46', 46" to another.

Although not shown in the figures, the interconnector plates 12, 12' may further comprise connectors, for electrically and mechanically connecting neighbouring fuel cell stacks 44 to one another, thus forming a SOFC module.

Figure 3:
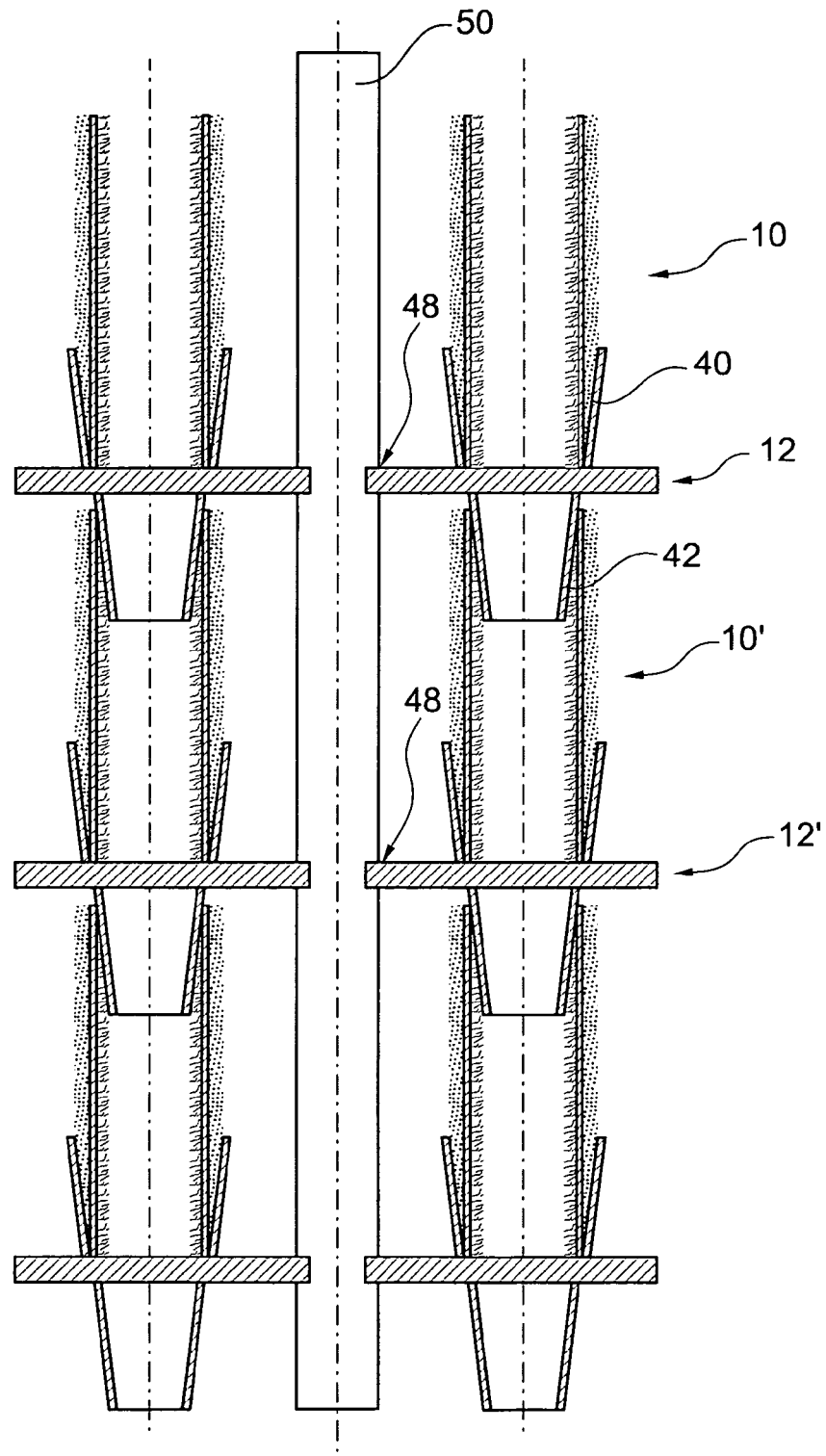
FIG. 3 is a schematic cut through an arrangement according to the invention wherein a cooling tube is further provided.

FIG. 3 shows a stack wherein the interconnector plates 12, 12' further comprise auxiliary holes 48 for receiving a heat exchanger tube 50 therethrough. The auxiliary holes 48 are arranged so that they are in line along a series of interconnector plates 12, 12'. Such a heat exchanger tube 50 serves as an integrated cooling device within the stack 44 for extracting heat therefrom.

The invention claimed is:

1. A micro-tubular solid oxide fuel cell arrangement comprising
   a fuel cell stack comprising at least two tubular fuel cell elements, said tubular fuel cell elements being arranged parallel to each other;
   each tubular fuel cell element comprising at least two micro-tubular elements, said micro-tubular elements each comprising a tubular inner electrode, covered on its outer surface with an electrolyte, said electrolyte being covered on its outer surface with a tubular outer electrode;
   a connection element arranged between said at least two micro-tubular elements for connecting one end of one micro-tubular element to one end of the other micro-tubular element;
   wherein each of said at least two micro-tubular elements of said tubular fuel cell element comprise a first end portion with an inner cone arranged in said tubular inner electrode and a second end portion with an outer cone arranged in said tubular outer electrode to form an electric serial connection of said micro-tubular elements;
   wherein said connection element comprises a metallic interconnector plate having a first side and an opposite second side, said interconnector plate being provided with at least two holes, one hole associated with each of said at least two tubular fuel cell elements, said interconnector plate comprising, around each of said holes:
   a first metallic connector on said first side, said first metallic connector having a conical shape with a cross-section narrowing in a direction away from said interconnector plate, said first metallic connector being dimensioned and arranged for contacting said first end portion of one of said micro-tubular elements
   a second metallic connector on said second side, said second metallic connector having a conical shape with a cross-section increasing in a direction away from said interconnector plate, said second metallic connector being dimensioned and arranged for contacting said second end portion of another one of said micro-tubular elements.

2. The arrangement according to claim 1, wherein said first metallic connector and/or said second metallic connector are provided with pores for allowing reactant gas flow to and from said electrolyte.

3. The arrangement according to claim 1, wherein said first metallic connector and/or said second metallic connector are made from ductile material.

4. The arrangement according to claim 1, wherein said first metallic connector and/or said second metallic connector are made from or coated with at least one of silver, silver plated metals, and silver containing metals.

5. The arrangement according to claim 1, wherein said interconnector plate is provided with at least one auxiliary hole for passing at least one heat exchanger tube therethrough.

6. The arrangement according to claim 1, wherein said metallic interconnector plate has a hexagonal cross-section.

7. The arrangement according to claim 1, wherein said metallic interconnector plate has a rectangular cross-section, wherein a length of the rectangular section is considerably longer than a width thereof.

8. The arrangement according to claim 1, wherein said metallic interconnector plate comprises electrical connectors.

9. The arrangement according to claim 1, wherein said metallic interconnector plate comprises mechanical connectors.

* * * * *